US009848098B2

(12) United States Patent
Mita

(10) Patent No.: US 9,848,098 B2
(45) Date of Patent: Dec. 19, 2017

(54) IMAGE FORMING APPARATUS CAPABLE OF CORRECTING IMAGE FORMATION POSITION

(71) Applicant: KONICA MINOLTA, INC., Chiyoda-ku, Tokyo (JP)

(72) Inventor: Mieko Mita, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/964,489

(22) Filed: Dec. 9, 2015

(65) Prior Publication Data
US 2016/0219172 A1   Jul. 28, 2016

(30) Foreign Application Priority Data
Jan. 28, 2015   (JP) .................................. 2015-014215

(51) Int. Cl.
  *H04N 1/00*   (2006.01)
(52) U.S. Cl.
  CPC ....... *H04N 1/00748* (2013.01); *H04N 1/0057* (2013.01); *H04N 1/00713* (2013.01); *H04N 1/00761* (2013.01); *H04N 1/00795* (2013.01); *H04N 2201/0081* (2013.01)
(58) Field of Classification Search
  CPC ............. H04N 1/00748; H04N 1/0057; H04N 1/00713; H04N 1/00761; H04N 1/00795; H04N 2201/0081
  See application file for complete search history.

(56) References Cited

U.S. PATENT DOCUMENTS

| 2003/0043256 | A1* | 3/2003 | Conrow | H04N 1/00031 347/248 |
| 2008/0158634 | A1* | 7/2008 | Otoguro | B41J 2/471 359/224.1 |
| 2009/0067893 | A1* | 3/2009 | Kurosawa | G03G 15/5058 399/301 |
| 2012/0308127 | A1* | 12/2012 | Kudoh | G06K 9/4652 382/165 |
| 2015/0070732 | A1* | 3/2015 | Kishi | G03G 15/5062 358/3.27 |

FOREIGN PATENT DOCUMENTS

| JP | 2005091823 A | 4/2005 |
| JP | 2009042461 A | 2/2009 |

\* cited by examiner

*Primary Examiner* — Iriana Cruz
(74) *Attorney, Agent, or Firm* — Holtz, Holtz & Volek PC

(57) ABSTRACT

An image processing apparatus 1 obtains displacement amounts of patterns formed on front and back sides of a recording sheet respectively, and performs correction of an image formation position based on the displacement amounts. The image processing apparatus 1 calculates the lengths of the sides of each of the front and back sides of a recording sheet by detecting the intersection points of the surrounding edges of the recording sheet with reference to the image data of the each of the front and back sides. A magnification error is calculated based on the lengths of the sides corresponding between the front and back sides. A correction amount is then calculated based on the calculated magnification error in order to make the lengths of each side match each other. Displacement amounts of the positions of the patterns is obtained after correction based on the correction amount.

20 Claims, 8 Drawing Sheets

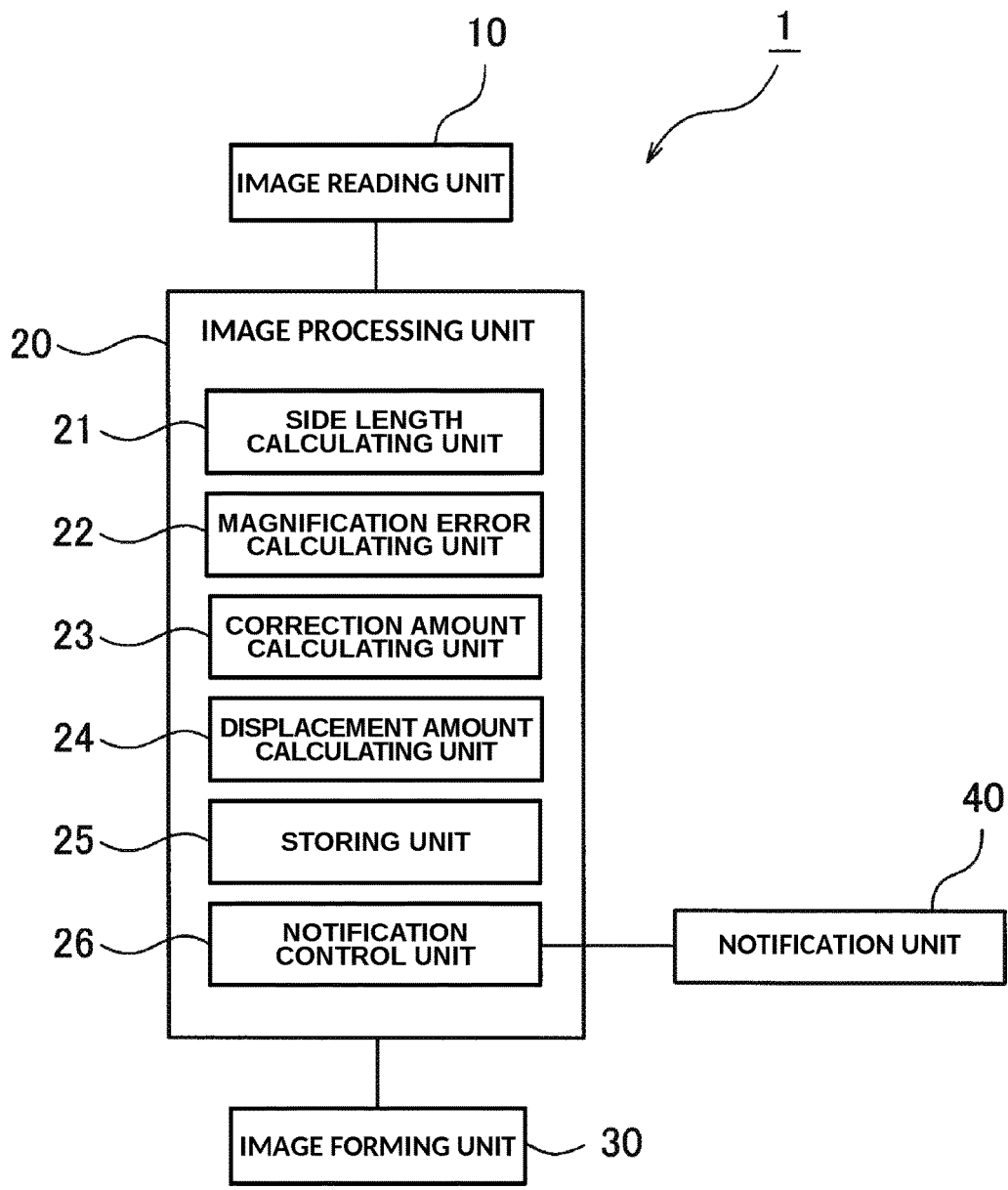

IMAGE FORMING APPARATUS CAPABLE OF CORRECTING IMAGE FORMATION POSITION

CROSS-REFERENCE TO RELATED APPLICATIONS

The present application claims priority under 35 U.S.C. §119 to Japanese Patent Application No. P2015-014215, filed Jan. 28, 2015. The contents of this application are herein incorporated by reference in their entirety.

BACKGROUND OF THE INVENTION

Field of Invention

The present invention relates to an image forming apparatus capable of correcting image formation positions.

Description of Related Art

Conventionally, image forming apparatuses have been proposed which can adjust the image formation positions on the front and back sides of a sheet in order that images printed on the both sides are aligned with each other. In a type of such image forming apparatuses, the positional displacement between the front and back sides is obtained, for example, by printing position adjustment marks on the front and back sides of a sheet, reading the marks of the sheet with a scanner device to obtain the positional and orientation displacement of the sheet as reading errors, performing image process in order that images on the front and back sides are aligned based on the errors, and obtaining the positional displacement between the front and back sides with reference to the processed image data (for example, refer to Japanese Patent Published Application No. 2005-91823).

Another type has been proposed which is provided with a size detecting unit for detecting a paper size by detecting the edges of a sheet, and capable of detecting the paper sizes before and after expansion of the sheet due to thermal fixing, and determining the reduce/enlarge ratio of printing in accordance with the difference between the paper sizes (for example, refer to Japanese Patent Published Application No. 2009-42461).

However, in the case of the above conventional image forming apparatuses, the accuracy of positional adjustment may be deteriorated by occurrence of magnification error (incorrect recognition of slight variation in paper size between when reading the front side of a recording sheet and when reading the back side of the recording sheet) due to the differential conveying speed of the recording sheet or the like while the scanner device is reading the position adjustment marks which are printed.

More specifically explaining, for example, there is a one-path scanning system provided with scanner devices on the front side and the back side of a recording sheet respectively on a transfer route through which the recording sheet is conveyed. In this system, the position adjustment marks are read by the two scanner devices while the recording sheet is passed through the transfer route. However, when there is a difference in the speed of the recording sheet between when the front side of the recording sheet is passed through the scanner device and when the back side of the recording sheet is passed through the scanner device, magnification error occurs as described above. Also, even when there is no difference in the speed of the recording sheet, slight magnification error may occur because different scanner devices have different characteristics and so forth.

Furthermore, for example, there is a flat head scanner capable of reading information of a recording sheet on a document reading glass surface by moving a scanner device in relation to the document reading glass surface. This flat head scanner first is moved to read the image information of one side of a recording sheet placed on the glass surface, and then moved again to read the image information of the other side of the recording sheet after reversing the recording sheet. Even in the case of this flat head scanner, magnification error may occur due to different moving speeds between when the scanner device moves to read one side and when the scanner device moves to read the other side.

As discussed above, in the conventional image forming apparatus, the accuracy of adjusting the position of images on the front and back sides is deteriorated under the influence of magnification error.

SUMMARY OF THE INVENTION

To achieve at least one of the abovementioned objects, reflecting one aspect of the present invention, an image forming apparatus obtains displacement amounts of patterns formed on front and back sides of a recording sheet respectively, and performs correction of an image formation position based on the displacement amounts, and comprises: an image reading unit structured to read front and back sides of a recording sheet respectively including background images as image data; a side length calculating unit structured to calculate the lengths of the sides of each of the front and back sides of the recording sheet by detecting surrounding edges of the recording sheet and four apices as intersection points of the surrounding edges with reference to the image data of the front and back sides which are read by the image reading unit; a magnification error calculating unit structured to calculate a magnification error based on the lengths of sides corresponding between the front and back sides calculated by the side length calculating unit; a correction amount calculating unit structured to calculate a correction amount based on the magnification error calculated by the magnification error calculating unit; and a displacement amount calculating unit structured to obtains the displacement amount of the positions of the patterns detected based on the image data read by the image reading unit after correction based on the correction amount calculated by the correction amount calculating unit.

BRIEF DESCRIPTION OF THE DRAWINGS

FIG. 1 is a block diagram for showing an image forming apparatus in accordance with a first embodiment.

DETAILED DESCRIPTION OF THE PREFERRED EMBODIMENT

Hereinafter, a description is given of embodiments of the present invention with reference to the drawings.

FIG. 1 is a block diagram for showing an image forming apparatus in accordance with a first embodiment. As shown in FIG. 1, the image forming apparatus 1 obtains the displacement amounts of patterns which are formed in advance on the front and back sides of a recording sheet by this apparatus 1, and performs the correction of image formation positions based on the displacement amounts. The image forming apparatus 1 is provided with an image reading unit 10, an image processing unit 20 and an image forming unit 30.

The image reading unit 10 reads the front and back sides of a recording sheet respectively as image data including background images. This image reading unit 10 is, for example, a scanner device based on a one-path scanning system or a flat head scanner device.

Figure 2A:
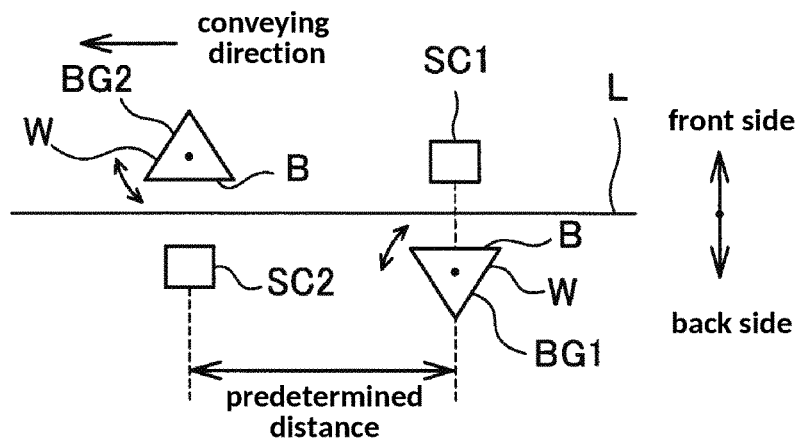
FIG. 2A is a schematic view for showing an example of the image reading unit shown in FIG. 1 as a scanner device based on a one-path scanning system.
Figure 2B:
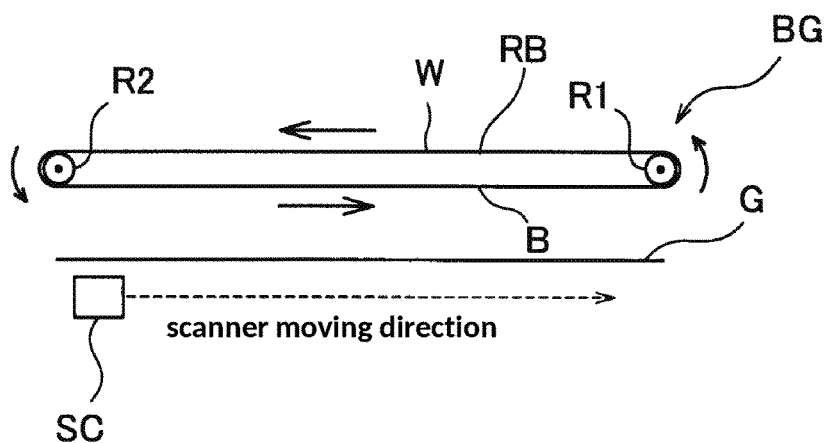
FIG. 2B is a schematic view for showing another example of the image reading unit shown in FIG. 1 as a flat head scanner.

FIG. 2A is a schematic view for showing an example of the image reading unit 10 shown in FIG. 1 as a scanner device based on a one-path scanning system. FIG. 2B is a schematic view for showing another example of the image reading unit 10 as a flat head scanner.

As illustrated in FIG. 2A, the scanner device based on the one-path scanning system includes scanners SC1 and SC2 which are installed respectively in one side (front side) and the other side (back side) of a transfer route L through which a recording sheet is conveyed. The scanners SC1 and SC2 read the image information of the recording sheet based on the light which is emitted to and reflected from the recording sheet. These scanners SC1 and SC2 are spaced a predetermined distance from each other in the conveying direction of the recording sheet.

The scanner device based on the one-path scanning system is provided with two background setting mechanisms (background setting units) BG1 and BG2. The background setting mechanisms BG1 and BG2 are arranged to face the two scanners SC1 and SC2 respectively with the transfer route L therebetween.

Each of the background setting mechanisms BG1 and BG2 is in the form of a prism having a polygonal cross section, for example, an equilateral triangle in the case of an example shown in FIG. 2A. One of the three side surfaces of the background setting mechanisms BG1 and BG2 is a black surface B which is solid black. Another side surface is a white surface W which is solid white. Each of the background setting mechanisms BG1 and BG2 is provided with a rotation shaft through the center of the polygonal cross section, and capable of selectively facing a corresponding one of the scanners SC1 and SC2 with either the black surface B or the white surface W by rotating around the rotation shaft.

Which the black surface B or the white surface W is to face can be selected by user operation or automatically selected by the image forming apparatus 1 which determines the color of the recording sheet. This selection is made in order that the gradation difference between the background and the recording sheet is no smaller than a predetermined level. For example, if the recording sheet is gray, the background setting mechanisms BG1 and BG2 are rotated to face the scanners SC1 and SC2 with the white surfaces W, and if the recording sheet is white, the background setting mechanisms BG1 and BG2 are rotated to face the scanners SC1 and SC2 with the black surfaces B.

The scanner device based on the one-path scanning system is not limited to the above type, but can be such a type provided with only one scanner for acquiring image information and a mechanism for reversing the front and back sides of a recording sheet to acquire the image of the front side, reverse the front and back sides and acquire the image of the back side in this order.

As illustrated in FIG. 2B, a flat head scanner device includes a reading glass surface G on which a recording sheet is placed, and a scanner SC which can move in a predetermined scanner moving direction in the side of the reading glass surface G where the recording sheet is not placed (i.e., in the back side) for optically scanning the recording sheet placed on the reading glass surface G. The scanner SC reads the image information of the recording sheet based on the light which is emitted to and reflected from the recording sheet as described above. To read the image information from the front and back sides of the recording sheet, the flat head scanner device has to reverse the recording sheet after scanning one side with the scanner SC, and then scan again the other side with the scanner.

The flat head scanner device is provided with a background setting mechanism (background setting unit) BG. The background setting mechanism BG is arranged to face the scanner SC with the reading glass surface G therebetween.

The background setting mechanism BG consists of an endless belt RB and two rollers R1 and R2. The first roller R1 is arranged in the moving direction side of the scanner SC, and the second roller R2 is arranged in the side (base position side) opposite the moving direction side of the scanner SC. One of the rollers R1 and R2 is a drive roller, and the other is a follower roller. On the other hand, the endless belt RB has a black surface B and a white surface W on the outer side thereof in order that the scanner SC faces either the black surface or the white surface. Namely, the background setting mechanism BG can switch between the black surface B and the white surface W of the endless belt RB to face the reading glass surface G, i.e., the scanner SC by rotationally driving the drive roller.

Which the black surface B or the white surface W is to face can be selected by user operation or automatically selected by the image forming apparatus 1 in accordance with the color of the recording sheet in the same manner as the scanner device based on the one-path scanning system. Likewise, this selection is made in order that the gradation difference between the background and the recording sheet is no smaller than a predetermined level.

Figure 3A:
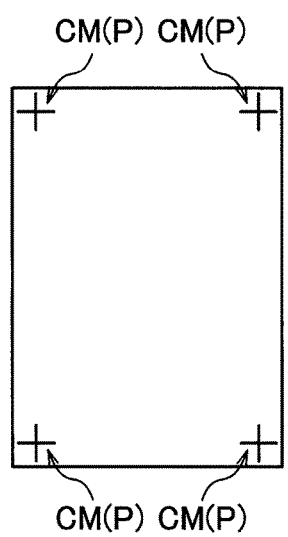
FIG. 3A is a front view for showing a first example of the patterns to be formed on a recording sheet.
Figure 3B:
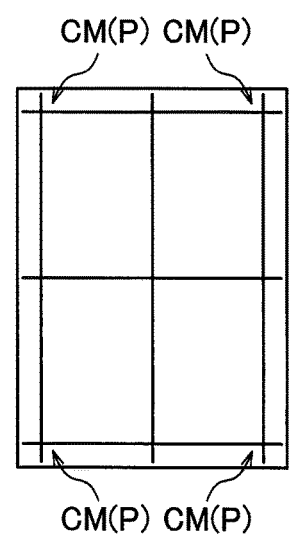
FIG. 3B is a front view for showing a second example of the patterns to be formed on a recording sheet.

The following patterns are formed in advance on a recording sheet by the apparatus 1. FIG. 3A is a front view for showing a first example of the patterns to be formed on the recording sheet. FIG. 3B is a front view for showing a second example of the patterns. As illustrated in FIG. 3A, patterns P are cross marks CM which are formed at the four corners of a recording sheet and each of which consists of two orthogonally crossing line segments. Alternatively, as illustrated in FIG. 3B, patterns P may be line segments which are elongated and combined to form the similar cross marks CM. Furthermore, while either one of the examples shown in FIG. 3A and FIG. 3B is formed on the front side of a recording sheet, the other example may be formed on the back side.

In the case where the image reading unit 10 is a flat head scanner device, in addition to the patterns P shown in FIG. 3A or FIG. 3B, different marks are formed between the front and back sides in positions which are distant from the center position of the recording sheet and aligned with each other between the front and back sides. In this case, the image forming apparatus 1 cannot know in what way a user places a recording sheet in relation to the reading glass surface G in the flat head scanner device. The above additional marks make it possible to accurately determine the front, back, left, right, top and bottom of a recording sheet.

Figure 4A:
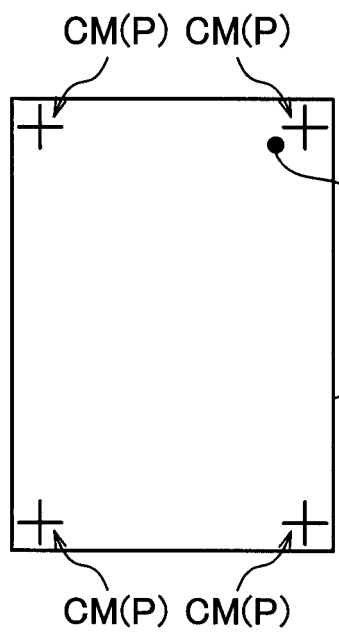
FIG. 4A shows an example of marks which are different between the front and back sides of a recording sheet and formed on the front side.
Figure 4B:
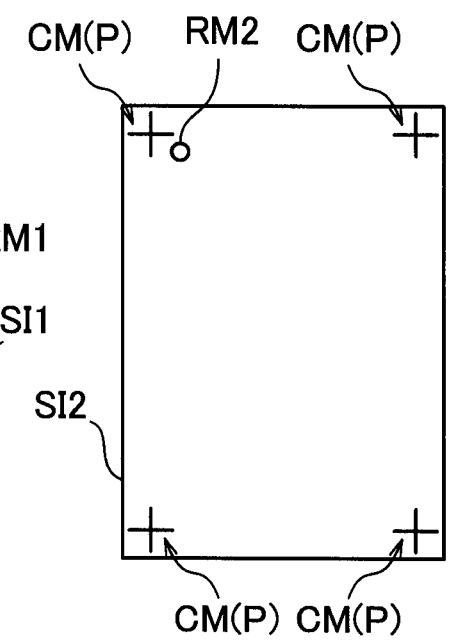
FIG. 4B shows an example of marks which are different between the front and back sides of a recording sheet and formed on the back side.

FIG. 4A and FIG. 4B show an example of formation of the additional marks which are different between the front and back sides of a recording sheet. FIG. 4A shows the mark on the front side and FIG. 4B shows the mark on the back side. As illustrated in FIG. FIG. 4A, in addition to the four patterns P consisting of the cross marks CM, a solid black circular mark RM1 is formed as the additional mark on the front side of the recording sheet at the upper right corner (inside of the cross mark CM). On the other hand, as illustrated in FIG. 4B, in addition to the four patterns P consisting of the cross marks CM, an open white circular mark RM2 is formed as the additional mark on the back side of the recording sheet at the upper left corner (inside of the cross mark CM). The open white circular mark RM2 is thereby located in the position just behind the solid black circular mark RM1. The different marks are therefore formed between the front and back sides in positions which are distant from the center position of the recording sheet and aligned with each other between the front and back sides.

FIG. 1 is referred to. The image processing unit 20 serves to adjust the image formation position by controlling the image forming unit 30 based on the displacement amount of the pattern P which is read by the image reading unit 10. This image processing unit 20 includes a side length calculating unit 21, a magnification error calculating unit 22, a correction amount calculating unit 23 and a displacement amount calculating unit 24.

The side length calculating unit 21 calculates the lengths of the sides of each of the front and back sides of a recording sheet by detecting the intersection points of the surrounding edges of the recording sheet as apices with reference to the image data of the each of the front and back sides which are read by the image reading unit 10.

Figure 5A:
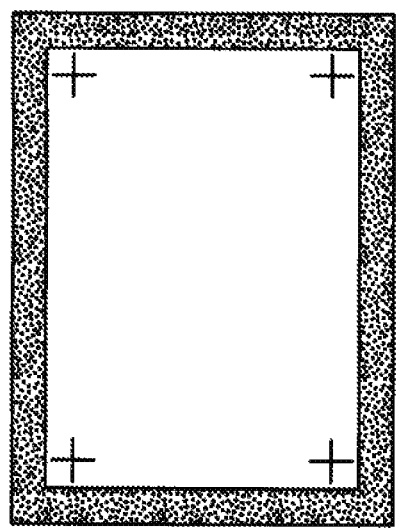
FIG. 5A shows an example of image data of the front and back sides read by the image reading unit respectively when the recording sheet is white.
Figure 5B:
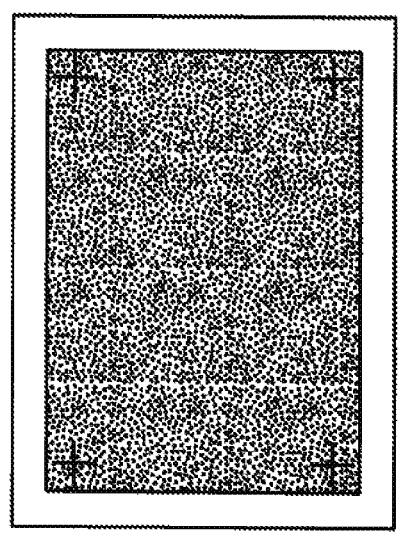
FIG. 5B shows an example of image data of the front and back sides read by the image reading unit respectively when the recording sheet is black.

FIG. 5A shows an example of image data of the front and back sides read by the image reading unit 10 respectively when the recording sheet to be read is white. FIG. 5B shows an example of image data of the front and back sides read by the image reading unit 10 respectively when the recording sheet to be read is black.

As illustrated in FIG. 5A, when the recording sheet is white, the background is selected in order that the gradation difference between the background and the recording sheet is no smaller than a predetermined level as described above, and thereby the background color is selected for example to be black. On the other hand, as illustrated in FIG. 5B, when the recording sheet is grey, the background color is selected for example to be white. The side length calculating unit 21 detects the surrounding edges of the recording sheet with reference to the gradation difference, and also detects the apex position at each of the four corners based on the surrounding edges.

More specifically speaking, the side length calculating unit 21 can detect the surrounding edges as the boundary between the recording sheet and the background based on the gradation difference between the recording sheet and the background. In this case, the side length calculating unit 21 first performs rough scanning and then finely detects the surrounding edges after the rough scanning.

Figure 6:
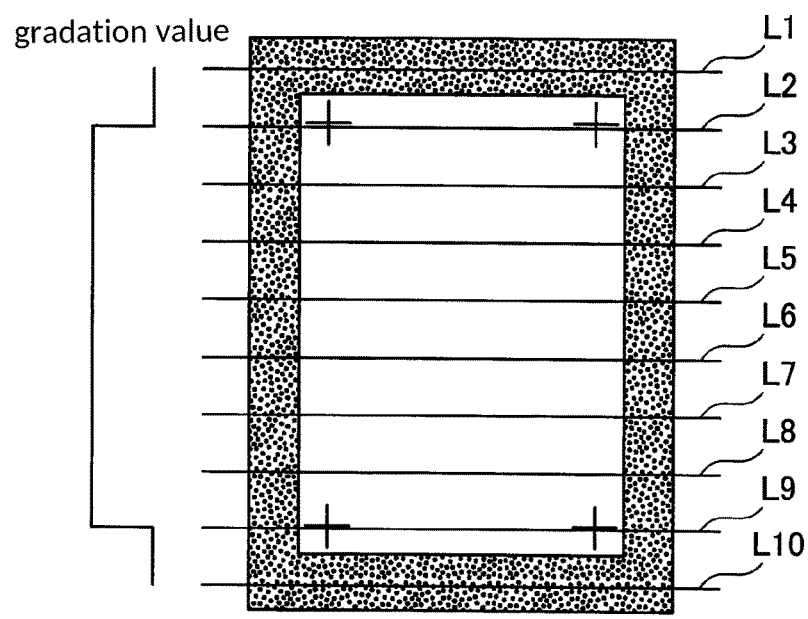
FIG. 6 is a schematic representation showing rough scanning by the side length calculating unit shown in FIG. 1.

FIG. 6 is a schematic representation showing the rough scanning by the side length calculating unit 21 shown in FIG. 1.

The side length calculating unit 21 roughly scans the image data in one direction (the main scanning direction or the subscanning direction). For example, the side length calculating unit 21 roughly scans the image in the main scanning direction as illustrated in FIG. 6. As a result, since the scan lines L1 and L10 are located in the background (black), the gradation values are small. On the other hand, since the scan lines L2 to L9 are located in the recording sheet (white), the gradation values are large. As a result of such rough scanning, the side length calculating unit 21 determines that the recording sheet is located at least between the scan lines L2 to L9. Incidentally, while the spacing of the scan lines L1 to L10 is somewhat wide in the figure for the purpose of illustration, the actual spacing is narrower than illustrated so that the scan lines are more numerous than illustrated.

The side length calculating unit 21 determines the position in which the recording sheet is located by comparing the gradation values with a predetermined threshold value. The side length calculating unit 21 compares the gradation value of the scan line L1 with the predetermined threshold value and determines that this gradation value is no greater than the predetermined threshold value. Next, the side length calculating unit 21 compares the gradation value of the scan line L2 with the predetermined threshold value and determines that this gradation value exceeds the predetermined threshold value. When the predetermined threshold value is continuously exceeded predetermined times during the rough scanning, the side length calculating unit 21 determines the scan line L2 as the first scan line exceeding the predetermined threshold value. The side length calculating unit 21 determines the scan line L9 in the same manner. The side length calculating unit 21 can therefore determine that the recording sheet is located at least between the scan lines L2 to L9.

While FIG. 6 illustrates an example of rough scanning in the main scanning direction, the similar process is performed for rough scanning in the subscanning direction. Also, while FIG. 6 illustrates an example in the case where the recording sheet is white, the magnitude relation between the gradation values and the predetermined threshold value is reversed for the similar process in the case where the recording sheet is black.

Figure 7:
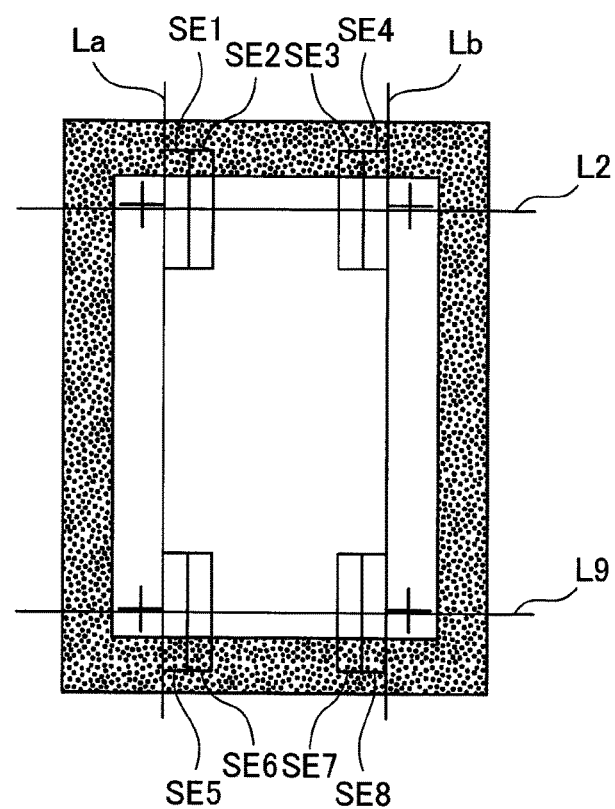
FIG. 7 is a schematic representation of showing an example of small segments.

The side length calculating unit 21 defines small segments after the rough scanning as described above. FIG. 7 is a schematic representation of showing examples of such small segments. The side length calculating unit 21 defines a plurality of small segments SE1 to SE8 with reference to the scan lines L2 and L9 at least between which the side length calculating unit 21 determines that the recording sheet is located. For example, the side length calculating unit 21 defines the plurality of small segments SE1 to SE8 in order that the scan lines L2 and L9 are aligned with the center positions of the plurality of small segments SE1 to SE8. The size of each of the small segments SE1 to SE8 (particularly, in the subscanning direction) is determined to include a sufficient number of pixels that the surrounding edges of the recording sheet are passed through the small segments SE1 to SE8. While the number of the small segments SE1 to SE8 is eight in FIG. 7, the present invention is not limited to this.

If two lines La and Lb shown in FIG. 7 are lines between which the side length calculating unit 21 determines that the recording sheet is located by rough scanning in the subscanning direction, the side length calculating unit 21 defines the plurality of small segments SE1 to SE8 between these lines La and Lb. Even when the lines La and Lb are not available, the small segments SE1 to SE8 can be prevented from being defined in a place outside the recording sheet by defining the small segments SE1 to SE8 in the middle of the recording sheet. The lines La and Lb are thereby not indispensable for defining the small segments SE1 to SE8.

Figure 8:
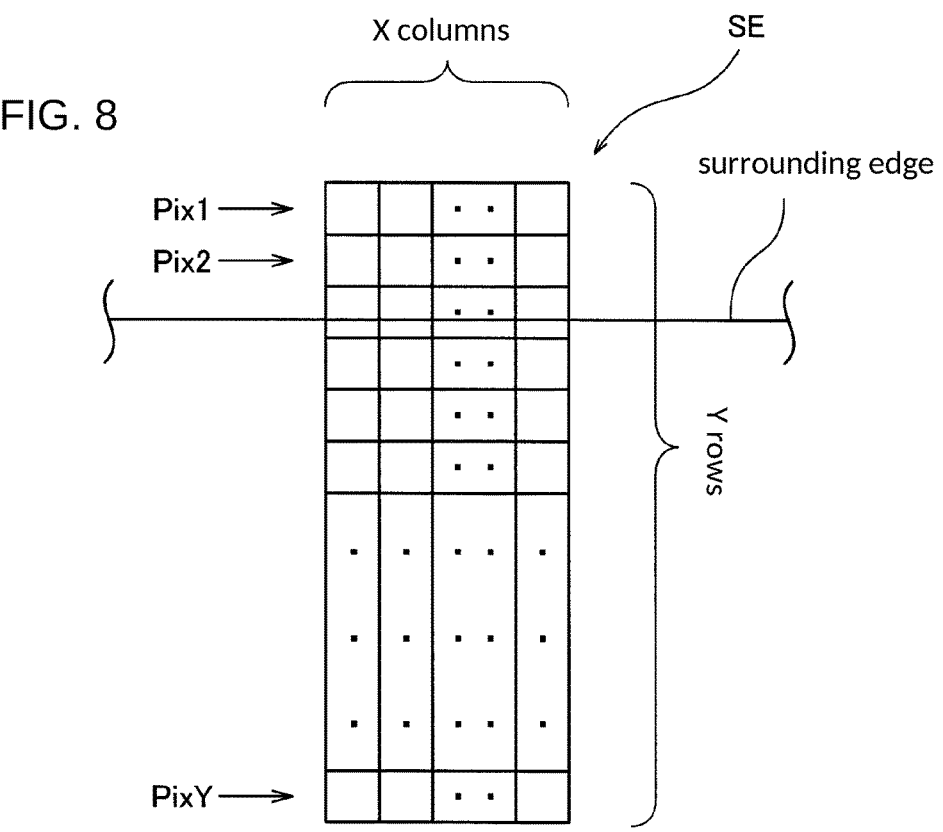
FIG. 8 is an enlarged view showing the first small segment shown in FIG. 7.

The side length calculating unit 21 then performs detailed analysis of the image data of each of the small segments SE1 to SE8. FIG. 8 is an enlarged view showing the first small segment SE1 shown in FIG. 7. In the example shown in FIG. 8, each pixel is enlarged for the purpose of illustration. While only the first small segment SE1 is referred to in FIG. 8 for explanation, each of the other small segments SE2 to SE8 is processed in the same manner as follows. In the following explanation, unless particular one of the eight small segments SE1 to SE8 is specified, the small segment is referred to simply as the small segment SE.

As illustrated in FIG. 8, the small segment SE is sized, for example, X pixels in the main scanning direction and Y pixels in the subscanning direction. The side length calculating unit 21 calculates the pixel average value (the average value of the gradation values) in the main scanning direction within the small segment, and creates profile data of the pixel average values in the subscanning direction. In the example shown in FIG. 8, the side length calculating unit 21 calculates the average value of the gradation values of the pixels arranged on the first row Pix1 of Y rows. Likewise, the side length calculating unit 21 calculates the average value of the gradation values of the pixels arranged on each of the second to Y-th rows Pix2 to PixY of the Y rows. The side length calculating unit 21 creates profile data expressed on a graph in which the ordinate is the average value of the gradation values and the abscissa is the row.

Figure 9:
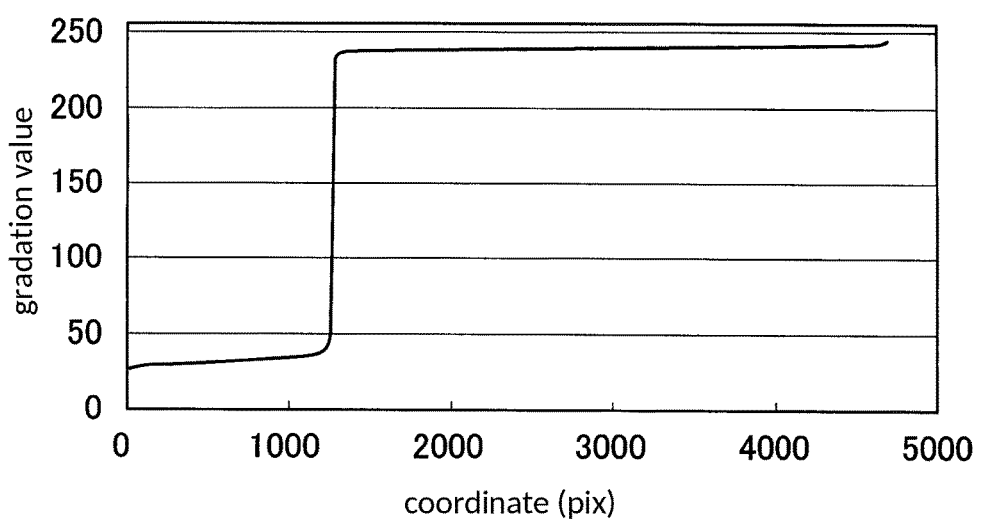
FIG. 9 is a graphic diagram for showing an example of profile data.

FIG. 9 is a graphic diagram for showing an example of the profile data. As illustrated in FIG. 9, the profile data is depicted such that the gradation value is smaller than 50 in a background region from pixel coordinate 0 to pixel coordinate 1200, and exceeds 200 from pixel coordinate 1300. The side length calculating unit 21 determines that the surrounding edge is located between pixel coordinates 1200 and 1300 with reference to the profile data.

More specifically explaining, the side length calculating unit 21 rearranges gradation values in the order of magnitude by scanning the profile data, determines three regions, i.e., a highlight region, an intermediate gradation region and a shadow region in the rearrange data, and calculates the average value of the gradation values in each of the highlight region and the shadow region. The side length calculating unit 21 then determines the threshold value by calculating the average value of the average values of the highlight and shadow regions. The side length calculating unit 21 obtains the coordinate of the surrounding edge (the coordinate in the vertical direction in which Y rows are arranged in FIG. 8) by comparing the profile data with the above threshold value. Specifically, when the gradation value increases from a value no larger than the threshold value to a value no smaller than the threshold value and then retains its value to be no smaller than the threshold value for a predetermined number of pixels (a predetermined number of rows), or when the gradation value decreases from a value no smaller than the threshold value to a value no larger than the threshold value and then retains its value to be no larger than the threshold value for a predetermined number of pixels (a predetermined number of rows), the side length calculating unit 21 determines the pixel (row) at which the gradation value changes across the threshold value as the coordinate of the surrounding edge (the coordinate in the vertical direction in which Y rows are arranged in FIG. 8). By this configuration, it is possible to avoid influence of a shadow due to floating-up of a sheet or an edge blur caused during reading with a scanner. The coordinate in the direction in which X columns shown in FIG. 8 are arranged can be set to the coordinate of the center of the X columns.

As has been discussed above, the side length calculating unit 21 obtains the coordinates of the surrounding edge in each small segment SE. The side length calculating unit 21 can obtain the coordinates of entire image data from the coordinate of each small segment SE. While the above description is an example of obtaining the coordinates of the surrounding edges in the main scanning direction, the surrounding edges in the subscanning direction can be obtained in the same manner.

As apparent from the subsequent process, the side length calculating unit 21 obtains n points (n≥2) on the same side of a recording sheet as the coordinates of the surrounding edge. Accordingly, two or more small segments SE are defined on the same side of a recording sheet.

The side length calculating unit 21 obtains the surrounding edge with reference to the n coordinates of the surrounding edge. More specifically, the side length calculating unit 21 obtains the surrounding edge on the side from the n coordinates of the surrounding edge by the use of approximate expression based on linear approximation. The side length calculating unit 21 obtains an approximate expression for each of the four sides, determines the coordinate positions of four intersections from the four approximate expressions as the apex coordinate positions at the four corners, and calculates the distance between each adjacent apex coordinate positions as the length of the corresponding side of the recording sheet.

For example, the side length calculating unit 21 derives the following approximate expression by the use of a least squares method.

$$a = \frac{n\sum_{k=1}^{n} x_k y_k - \sum_{k=1}^{n} x_k \sum_{k=1}^{n} y_k}{n\sum_{k=1}^{n} x_k^2 - \left(\sum_{k=1}^{n} x_k\right)^2}$$

$$b = \frac{\sum_{k=1}^{n} x_k^2 \sum_{k=1}^{n} y_k - \sum_{k=1}^{n} x_k y_k \sum_{k=1}^{n} x_k}{n\sum_{k=1}^{n} x_k^2 - \left(\sum_{k=1}^{n} x_k\right)^2}$$

$$f(x) = ax + b$$

If a horizontal side of the recording sheet corresponds to y=ax+b in the approximate expression, and a vertical side corresponds to x=cy+d, the side length calculating unit 21 calculates an approximate x-coordinate and an approximate y-coordinate of the intersection between the horizontal side and the vertical side as (b×c+d)/(1−a×c) and (a×d+b)/(1−a×c) respectively.

The side length calculating unit 21 determines the apex coordinate positions at the four corners of the image data from the approximate coordinates of four intersections, and calculates the distance between each adjacent apex coordinate positions as the length of the corresponding side of the recording sheet. The side length calculating unit 21 performs the above calculation for the front and back sides.

FIG. 1 is referred to. The magnification error calculating unit 22 calculates magnification error based on the lengths of the sides corresponding between the front and back sides calculated by the side length calculating unit 21. The sides corresponding between the front and back sides are meant to be the same side of the recording sheet, for example, the right side SI1 of the front side of the recording sheet and the left side SI2 of the back side in the example shown in FIG. 4.

The correction amount calculating unit 23 calculates a correction amount based on the magnification error calculated by the magnification error calculating unit 22. For example, if a particular side of a recording sheet has a length of α1 when calculated as seen from the front side of the recording sheet, and has a length of α2 when calculated as seen from the back side of the recording sheet, the magnification error is calculated to be α1/α2, and the correction amount is calculated to be α2/α1.

In what follows, the magnification error calculating unit 22 and the correction amount calculating unit 23 will be explained in detail. The magnification error calculating unit 22 and the correction amount calculating unit 23 can calculate a magnification error and a correction amount for correcting the magnification error respectively by any one of the following three processes. In accordance with the first process, the magnification error calculating unit 22 calculates the average value of the lengths of two parallel sides of a recording sheet calculated by the side length calculating unit 21 for each of the front and back sides, and calculates a magnification error based on these average values of the front and back sides. The correction amount calculating unit 23 calculates a correction amount for correcting this magnification error. There is an advantage in this method that, since the magnification error is calculated by handling the average values together, the process can be simplified and the processing load can be reduced, as compared with when the magnification error is calculated separately for each side.

In accordance with the second process, the magnification error calculating unit 22 calculates a first magnification error based on the lengths of a first side which are calculated by the side length calculating unit 21 for the front and back sides respectively, and calculates a second magnification error based on the lengths of a second side parallel to the first side in the same manner. The correction amount calculating unit 23 calculates a correction amount between the first and second sides on the assumption that the magnification error linearly varies between the first and second sides from the first magnification error to the second magnification error. Namely, in the case where the first magnification error is β1 (the correction amount for correcting this is β2) and the second magnification error γ1 (the correction amount for correcting this is γ2), the correction amount calculating unit 23 calculates the correction amount at the midpoint between the first and second sides as (β2+γ2)/2. By this calculation method, the correction amount can be calculated also between the first and second sides, it is possible to more accurately perform correction of the coordinate positions of patterns in the subsequent process.

In accordance with the third process, the magnification error calculating unit 22 calculates a first magnification error based on the lengths of a first side which are calculated by the side length calculating unit 21 for the front and back sides respectively, calculates a second magnification error based on the lengths of a second side parallel to the first side in the same manner, and calculates a final magnification error as the average value of the first magnification error and the second magnification error. The correction amount calculating unit 23 calculates a correction amount for correcting this final magnification error. This calculation method is similar to the first calculation method so that there is an advantage that the processing load can be reduced.

The displacement amount calculating unit 24 obtains the displacement amounts of the positions of the patterns P (more specifically, the cross marks CM) detected based on the image data read by the image reading unit 10 after correction based on the correction amount calculated by the correction amount calculating unit 23.

Figure 10:
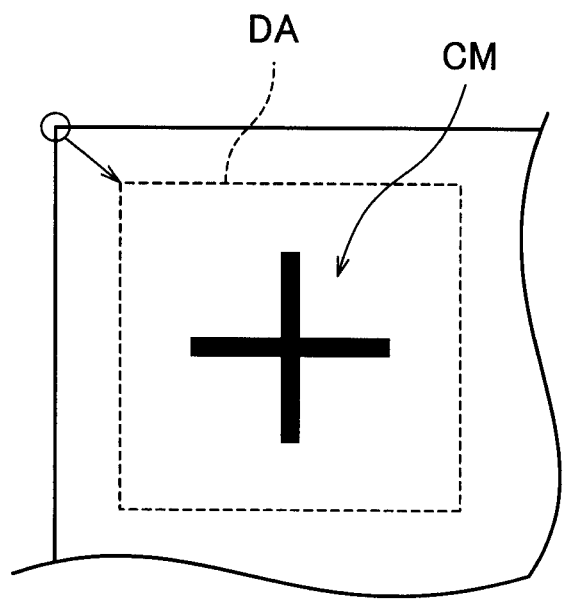
FIG. 10 is a schematic representation of a detection area which is defined by a displacement amount calculating unit.

Next, the displacement amount calculating unit 24 scans the image data within a detection area DA (FIG. 10) in the main scanning direction and the subscanning direction. By this process, profile data is created in the same manner as shown in FIG. 9. In this case, since the pattern P is a cross mark CM, peaks are detected in the profile data in the main scanning direction and profile data in the subscanning direction respectively. The displacement amount calculating unit 24 detects the coordinates of these peaks as the intersection coordinates of the cross mark CM.

Next, based on the intersection coordinates of the cross mark CM and the above approximate expression, the displacement amount calculating unit 24 obtains the coordinate positions of the four cross marks CM (patterns P) of the recording sheet in a X-Y coordinate system defined by the main scanning direction and the subscanning direction of the recording sheet. Specifically, the displacement amount calculating unit 24 obtains the coordinate positions of the intersection coordinates of each of the four cross marks CM in the coordinate system of the recording sheet by making use of the lengths d of the perpendicular lines from the intersection of each cross mark CM to the nearby sides (surrounding edges) respectively based on the approximate expression.

Figure 11:
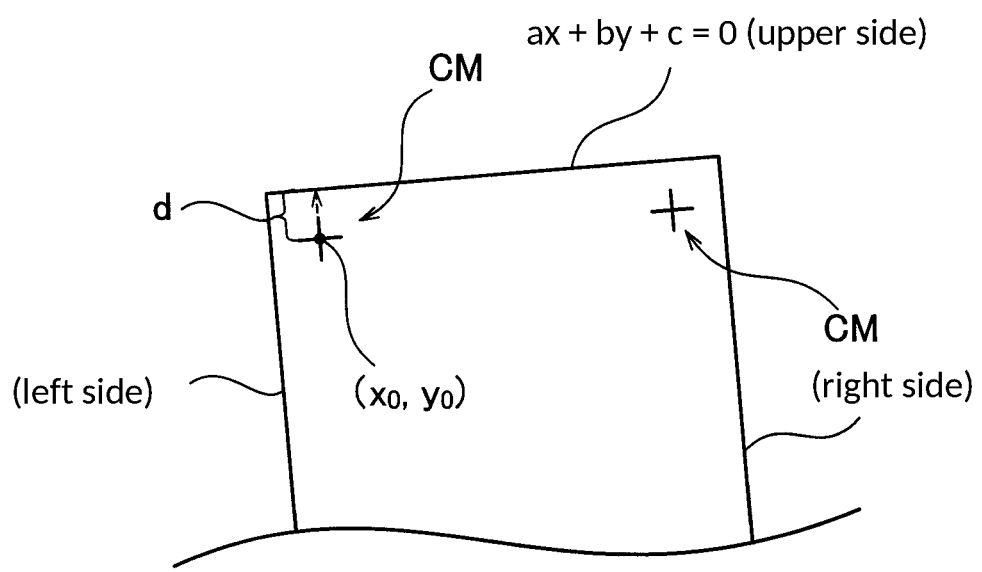
FIG. 11 is a schematic view for explaining the process of obtaining a coordinate position in the coordinate system of the recording sheet.

FIG. 11 is a schematic view for explaining the process of obtaining the coordinate position of a cross mark CM in the coordinate system of the recording sheet. As illustrated in FIG. 11, it is assumed that the intersection coordinates of the cross mark CM in the coordinate system of the image data are (x0, y0). Also, it is assumed that the approximate expression of a side near a cross mark CM (for example, the upper side of the recording sheet if the cross mark CM is located at the upper left corner) is ax+by+c=0. In this case, the displacement amount calculating unit 24 can obtain the length of the perpendicular line in accordance with the following equation.

$$d = \frac{|ax_0 + by_0 + c|}{\sqrt{a^2 + b^2}}$$

The displacement amount calculating unit 24 also obtains the length of the perpendicular line from the cross mark CM at the upper left corner to the left side of the recording sheet in the same manner. These lengths of the perpendicular lines are obtained as the coordinates in the coordinate system of the recording sheet, i.e., a X-Y coordinate system consisting of the coordinates in the main scanning direction and the subscanning direction of the recording sheet.

The displacement amount calculating unit 24 obtains the coordinate positions of the cross marks CM in the coordinate system of the recording sheet at the other three corners of the recording sheet in the same manner. The displacement amount calculating unit 24 performs the above process for both the front and back sides of the recording sheet.

Next, the displacement amount calculating unit 24 corrects the coordinates in the coordinate system of the recording sheet by the correction amounts calculated by the correction amount calculating unit 23, and calculates differential coordinate positions corresponding to the correction amounts as displacement amounts.

The image processing unit 20 adjusts the image formation positions for the front and back sides based on the displacement amounts calculated as described above. For example, the image processing unit 20 adjusts the image formation positions for the front and back sides by adjusting the image formation position of a latent image on a photoreceptor drum which is a constituent element of the image forming unit 30.

The image processing unit 20 is provided further with a storing unit 25 and a notification control unit 26. Also, the image forming apparatus 1 is provided further with a notification unit 40.

The storing unit 25 stores a normal range of the magnification error. For example, even when there is a variation in the conveying speed of a recording sheet in a scanner device based on a one-path scanning system, the variation is expected to fall within a reasonable range. Because of this, for example, if the magnification error is substantially large, it is determined that there is a fault in the reading operation of the scanners SC1 and SC2. The storing unit 25 thereby stores the values of the magnification error indicative of the normal range for excluding such a reading fault.

The notification control unit 26 serves to control the notification unit 40, and notifies, through the notification unit 40, a reading fault when the magnification error calculated by the magnification error calculating unit 22 is outside of the normal range of the magnification error stored in the storing unit 25. The notification unit 40 is, for example, a sound output unit, an image display or the like and notifies a reading fault in response to a command output from the notification control unit 26.

Figure 12:
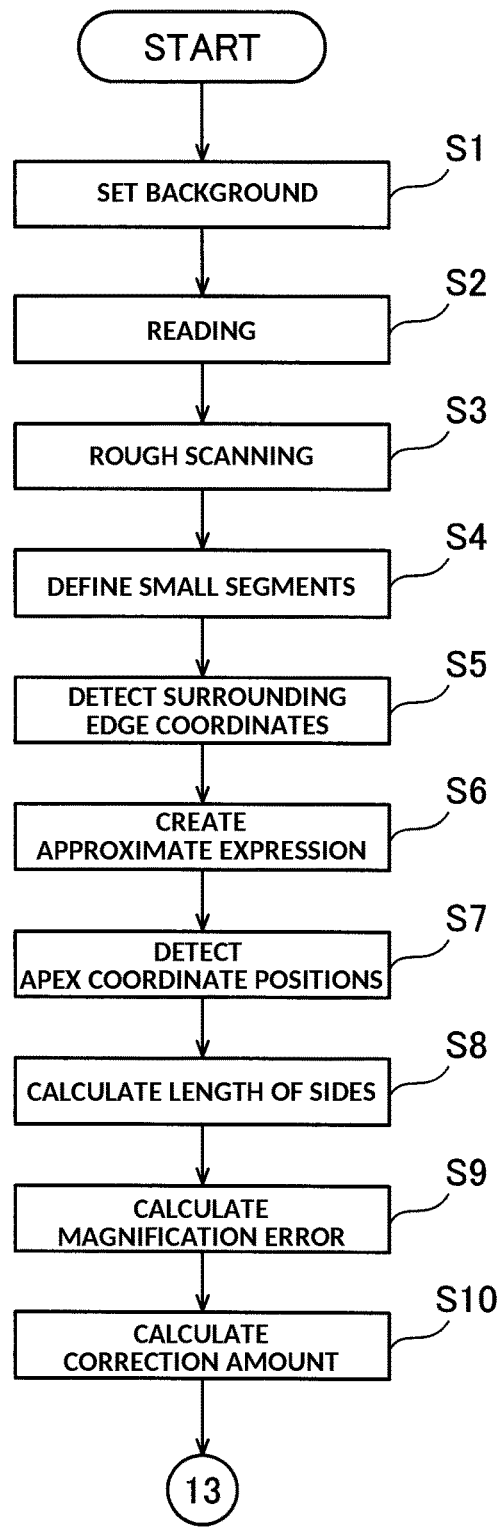
FIG. 12 shows a first half of a flow chart of the correction method of image formation positions in the case where a scanner device based on a one-path scanning system is used.
Figure 13:
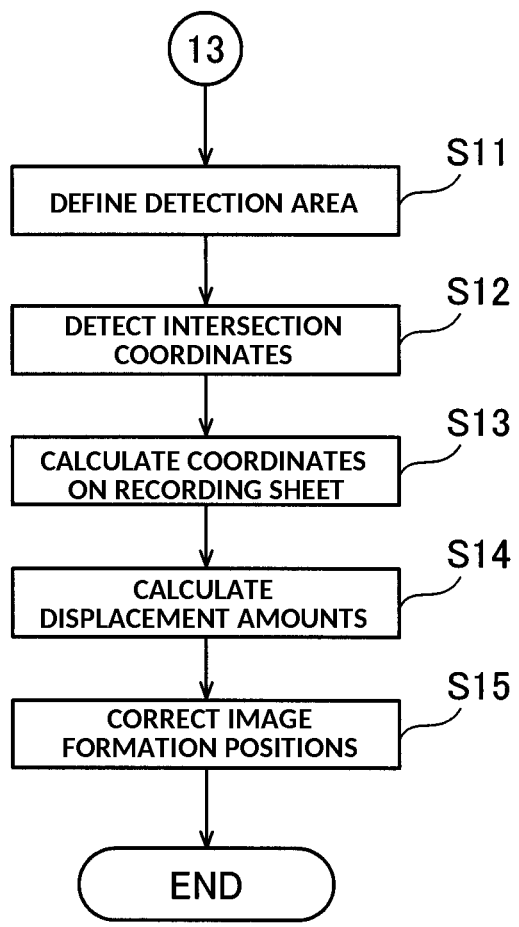
FIG. 13 shows a later half of the flow chart of the correction method of image formation positions in the case where a scanner device based on a one-path scanning system is used.

Next, a method of correcting an image formation position by the image forming apparatus 1 in accordance with the present embodiment will be explained. FIG. 12 and FIG. 13 show a flow chart of the correction method of image formation positions in the case where a scanner device based on a one-path scanning system is used. Incidentally, in advance of performing the correction method shown in FIG. 12 and FIG. 13, patterns P (four cross marks CM) are formed on the front and back sides of a recording sheet as shown in FIG. 3.

Referring to FIG. 12, the image forming apparatus 1 sets the background to either the black surface B or the white surface W by controlling the background setting mechanisms BG1 and BG2 (S1). The background is thereby set to a surface having a gradation difference from the recording sheet which is no smaller than a predetermined level. Incidentally, the background can be selected by user operation or automatically selected by the image forming apparatus 1 which determines the color of the recording sheet.

The image reading unit 10 reads the front and back sides of the recording sheet respectively by the scanners SC1 and SC2 as image data including background images (S2). The image data which is read is developed in the storing unit 25 of the image processing unit 20.

The side length calculating unit 21 performs rough scanning of the image data which is read in step S2 (S3). In this case, the side length calculating unit 21 performs the rough scanning as illustrated in FIG. 6. The side length calculating unit 21 defines a plurality of small segments SE, for example, as described above with reference to FIG. 7 (S4). At least two small segments SE are defined for each side of the recording sheet.

The side length calculating unit 21 creates profile data as shown in FIG. 9 for each small segment SE, and detects the coordinates of the surrounding edges based on the profile data (S5). Since at least two small segments SE are defined for each side of the recording sheet, at least two points are detected for each side of the recording sheet as the coordinates of the surrounding edge.

The side length calculating unit 21 obtains the surrounding edge of a side from the coordinates of the surrounding edge detected corresponding to a plurality of points by the use of the approximate expression based on linear approximation, and repeats this process to obtain the surrounding edges of all the four sides (S6). The side length calculating unit 21 detects the apex coordinate positions of the four corners in the coordinate system of the image data from the intersections based on the approximate expressions of the four sides (S7). The side length calculating unit 21 then calculates the distance between each adjacent apex coordinate positions of the four corners as the length of the corresponding side of the recording sheet (S8).

The magnification error calculating unit 22 obtains a magnification error based on the lengths of each side calculated in step S8 (S9). The correction amount calculating unit 23 calculates a correction amount based on the magnification error calculated in step S9, for example, in order to make the lengths of each side match each other (S10). The process in step S9 and step S10 is performed, for example, in accordance with any one of the three calculation methods as described above. The process then proceeds to step S11 shown in FIG. 13.

In step S11 shown in FIG. 13, the displacement amount calculating unit 24 defines a detection area DA for detecting each pattern P (cross mark CM) on the image data (S11). The displacement amount calculating unit 24 scans the image data within the detection area DA in the main scanning direction and the subscanning direction to detect the intersection coordinates of the four cross marks CM (S12).

Then, based on the intersection coordinates of the cross mark CM and the approximate expression calculated in step S6, the displacement amount calculating unit 24 obtains the coordinate positions of the four cross marks CM (patterns P) of the recording sheet in a X-Y coordinate system defined by the main scanning direction and the subscanning direction of the recording sheet (S13). In this case, the displacement amount calculating unit 24 obtains the coordinate positions of the intersection coordinates in the coordinate system of the recording sheet by making use of the lengths d of the perpendicular lines from the intersection of each cross mark CM to the nearby sides respectively based on the approximate expression.

The displacement amount calculating unit 24 corrects the coordinates of the four cross marks CM in the coordinate system of the recording sheet with reference to the correction amount calculated in step S10, and calculates the displacement amounts of the four cross marks CM (S14). This displacement amounts have been corrected by the correction amounts calculated by in step S10 and therefore, even if there is a difference in the speed of the recording sheet passing the scanners SC1 and SC2, this speed difference component has been eliminated. Furthermore, while slight magnification error may occur because the different scanner devices SC1 and SC2 may have different characteristics and so forth, the influence of this magnification error has also been eliminated.

The image processing unit 20 corrects the image formation positions for the front and back sides, for example, by adjusting the image formation position of a latent image on a photoreceptor drum which is a constituent element of the image forming unit 30 (S15). Then, the process shown in FIG. 12 and FIG. 13 is completed.

The process shown in FIG. 12 and FIG. 13 is provided for the correction method of the image formation position in the case where a scanner device based on a one-path scanning system is used. However, it is possible to similarly perform the method of correcting the image formation position in the case where a flat head scanner device is used. Needless to say, in the case where a flat head scanner device is used, the marks RM1 and RM2 shown in FIG. 4 are formed on a recording sheet in advance of performing the correction method of the image formation position. Also, in step S2, when image data is read from one side of the recording sheet, the read image data is stored in the storing unit 25, and then when image data is read from the other side of the recording sheet, the read image data is stored in the storing unit 25. The process in steps S3 through S8 are successively performed with the image data of the front and back sides.

In accordance with the image forming apparatus 1 of the present embodiment, as has been discussed above, the displacement amounts of the patterns P are calculated after correcting the coordinate positions of the patterns P formed on the front and back sides of a recording sheet by the correction amounts which are calculated based on the magnification error which is calculated based on the lengths of the sides corresponding between the front and back sides. Because of this, the displacement amounts of the patterns P on the front and back sides are calculated after correcting the magnification error due to the differential conveying speed of the recording sheet or the like, and therefore it is possible to improve the accuracy of positional adjustment.

Also, since the background setting mechanisms BG, BG1 and BG2 are further provided for setting the background having a gradation difference from the recording sheet which is no smaller than a predetermined level, it is possible to easily detect the surrounding edges of the recording sheet, for example, by making the background white if the recording sheet is gray, or making the background black if the recording sheet is white.

Furthermore, a plurality of points on the surrounding edge of each side of the recording sheet are detected as edge coordinates from which the surrounding edge of the each side is obtained in accordance with linear approximation, and the coordinate positions of the four apices are detected from the intersection points of the surrounding edges. In this case, in the case where the recording sheet is distorted, for example, one of the four corners is warped, distortion errors can be caused if the four apices are directly detected. However, in accordance with the present embodiment as described above, the coordinate positions of the four apices are detected based on the intersection points of the approximate surrounding edges so that such distortion errors are not caused to improve the accuracy of detecting the coordinate positions of the four apices.

For example, a magnification error is calculated from the average value of the lengths of two parallel sides of a recording sheet calculated for each of the front and back sides, and therefore the process can be simplified and the processing load can be reduced, as compared with when the magnification error is calculated separately for each side.

Alternatively, a first magnification error is calculated based on the lengths of a first side for the front and back sides respectively, and a second magnification error is calculated based on the lengths of a second side parallel to the first side in the same manner. A correction amount is calculated between the first and second sides on the assumption that the magnification error linearly varies between the first and second sides from the first magnification error to the second magnification error. Because of this, since the correction amount can be calculated also between the first and second sides, it is possible to more accurately perform correction of the coordinate positions of patterns P in the subsequent process.

Also, since the pattern P is a cross mark consisting of two orthogonally crossing line segments, the coordinate position of the pattern P can be detected as the intersection point of the cross mark formed each of the four corners of a recording sheet, and therefore can be detected by defining areas near the four corners respectively in which the detection operation is performed to detect the pattern P.

Furthermore, since the detection area DA is defined for scanning the inside thereof, the intersection coordinates of the cross mark CM can accurately be detected in the image data as compared with the case where the pattern P is detected by scanning the entirety of the image data. Still further, since the coordinate positions of the patterns P of the recording sheet are obtained in a X-Y coordinate system defined by the main scanning direction and the subscanning direction of the recording sheet based on the intersection coordinates and the approximate expression, the coordinate position of the pattern P in the coordinate system of the recording sheet can be accurately obtained from the intersection coordinates accurately obtained in the coordinate system of the image data.

Still further, since a reading fault is notified when the magnification error is outside of the normal range, for example, in the case where the magnification error is too large or too small, it is possible to prompt a user to check the system and perform position adjustment of the front and back sides by the use of an accurate magnification error by notifying an abnormal situation.

Still further, the circular marks RM1 and RM2 which are different between the front and back sides are formed in positions which are distant from the center position of the recording sheet and aligned with each other between the front and back sides. Because of this, when the flat head scanner device performs reading operation, these circular marks RM1 and RM2 which are different between the front and back sides make it possible to distinguish the front and back sides of the recording sheet and distinguish the sides corresponding between the front and back sides in which the circular marks RM1 and RM2 are located in positions which are distant from the center position of the recording sheet and aligned with each other between the front and back sides. Accordingly, it is possible to accurately perform position adjustment of the front and back sides by taking into consideration the magnification error which may occurs during performing reading operation with the flat head scanner device.

The image forming apparatus have been explained based on the embodiments in accordance with the present invention. However, it is not intended to limit the present invention to the precise form described, and obviously many modifications and variations are possible without departing from the scope of the invention.

For example, while the magnification error calculating unit 22 of the above embodiment calculates a magnification error in each of the main scanning direction and the sub-scanning direction, and the correction amount calculating unit 23 of the above embodiment calculates correction amounts based on these magnification error, the present invention is not limited to this but can be applied to the system in which the magnification error calculating unit 22 calculates a magnification error based on the lengths of the sides corresponding between the front and back sides calculated by the side length calculating unit 21 and extending in the subscanning direction, and the correction amount calculating unit 23 calculates a correction amount based on the magnification error calculated by the magnification error calculating unit 22 in order to make the lengths of the sides extending in the subscanning direction match each other. In this case, it is possible to simplify the process, and calculate a correction amount based on a magnification error calculated particularly in accordance with the variation in the conveying speed of the recording sheet and the moving speed of the scanner SC to correct the image formation positions for the front and back sides.

What is claimed is:

1. An image forming apparatus which obtains displacement amounts of patterns formed on front and back sides of a recording sheet respectively, and performs correction of an image formation position based on the displacement amounts, the image forming apparatus comprising:
   a scanner device configured to read front and back sides of a recording sheet respectively including background images as image data;
   a side length calculating unit configured to calculate lengths of sides of each of the front and back sides of the recording sheet by detecting surrounding edges of the recording sheet and four apices as intersection points of the surrounding edges with reference to the image data of the front and back sides which are read by the scanner device;
   a magnification error calculating unit configured to calculate a magnification error based on the lengths of sides corresponding between the front and back sides calculated by the side length calculating unit;
   a correction amount calculating unit configured to calculate a correction amount based on the magnification error calculated by the magnification error calculating unit; and
   a displacement amount calculating unit configured to obtain the displacement amount of the positions of the patterns detected based on the image data read by the scanner device after correction based on the correction amount calculated by the correction amount calculating unit.

2. The image forming apparatus of claim 1, wherein the scanner device comprises at least one background setting mechanism configured to set a background having a gradation difference from the recording sheet which is no smaller than a predetermined level.

3. The image forming apparatus of claim 1, wherein the side length calculating unit detects a plurality of points on the surrounding edge of each side of the recording sheet as edge coordinates from which the surrounding edge of each side is obtained based on an approximate expression in accordance with linear approximation, obtains the approximate expression for each of the four sides, determines coordinate positions of four intersections as the apices from the four approximate expressions in a coordinate system of the image data, and calculates a distance between each pair of adjacent apex coordinate positions in the coordinate system of the image data as the length of the corresponding side of the recording sheet.

4. The image forming apparatus of claim 1, wherein the magnification error calculating unit calculates an average value of the lengths of two parallel sides of the recording sheet calculated by the side length calculating unit for each of the front and back sides, and calculates the magnification error based on the average values of the front and back sides.

5. The image forming apparatus of claim 1, wherein the magnification error calculating unit calculates a first magnification error based on the lengths of a first side which are calculated by the side length calculating unit for the front and back sides respectively, and calculates a second magnification error based on the lengths of a second side parallel to the first side in the same manner, and
   wherein the correction amount calculating unit calculates a correction amount between the first and second sides on the assumption that the magnification error linearly varies between the first and second sides from the first magnification error to the second magnification error.

6. The image forming apparatus of claim 3, wherein a cross mark which consists of two orthogonally crossing line segments is formed as the pattern in the vicinity of each of the four corners of the recording sheet in advance of reading the image data by the scanner device.

7. The image forming apparatus of claim 6, wherein the displacement amount calculating unit defines a detection area for detecting the pattern in a predetermined area inside each of the four apices detected by the side length calculating unit, detects intersection coordinates of the four cross marks as the pattern in the coordinate system of the image data by scanning the image data within the detection areas in a main scanning direction and a subscanning direction, and obtains coordinate positions of the four cross marks based on the four intersection coordinates and the approximate expressions in a X-Y coordinate system defined by the main scanning direction and the subscanning direction of the recording sheet.

8. The image forming apparatus of claim 1, wherein the magnification error calculating unit calculates a magnification error based on the lengths of the sides corresponding between the front and back sides calculated by the side length calculating unit and extending in a subscanning direction, and wherein the correction amount calculating unit calculates a correction amount based on the magnification error calculated by the magnification error calculating unit in order to make the lengths of the sides extending in the subscanning direction match each other.

9. The image forming apparatus of claim 1, further comprising:

a storing unit configured to store a normal range of the magnification error; and a notification unit configured to notify a reading fault when the magnification error calculated by the magnification error calculating unit is outside of the normal range of the magnification error stored in the storing unit.

10. The image forming apparatus of claim 1, wherein in addition to the patterns, marks which are different between the front and back sides are formed in positions which are separated from a center position of the recording sheet and aligned with each other between the front and back sides.

11. A method performed by an image forming apparatus to obtain displacement amounts of patterns formed on front and back sides of a recording sheet respectively, and perform correction of an image formation position based on the displacement amounts, the method comprising:

reading, with a scanner device, front and back sides of a recording sheet respectively including background images as image data;

calculating lengths of sides of each of the front and back sides of the recording sheet by detecting surrounding edges of the recording sheet and four apices as intersection points of the surrounding edges with reference to the image data of the front and back sides which are read by the scanner device;

calculating a magnification error based on the calculated lengths of sides corresponding between the front and back sides;

calculating a correction amount based on the calculated magnification error; and obtaining the displacement amount of the positions of the patterns detected based on the image data read by the scanner device after correction based on the calculated correction amount.

12. The method of claim 11, wherein the scanner device comprises at least one background setting mechanism, and wherein the method further comprises controlling the at least one background setting mechanism to set a background having a gradation difference from the recording sheet which is no smaller than a predetermined level.

13. The method of claim 11, wherein calculating the lengths of the sides comprises:

detecting a plurality of points on the surrounding edge of each side of the recording sheet as edge coordinates from which the surrounding edge of each side is obtained based on an approximate expression in accordance with linear approximation;

obtaining the approximate expression for each of the four sides;

determining coordinate positions of four intersections as the apices from the four approximate expressions in a coordinate system of the image data; and calculating a distance between each pair of adjacent apex coordinate positions in the coordinate system of the image data as the length of the corresponding side of the recording sheet.

14. The method of claim 11, wherein calculating the magnification error comprises calculating an average value of the calculated lengths of two parallel sides of the recording sheet for each of the front and back sides, and calculating the magnification error based on the average values of the front and back sides.

15. The method of claim 11, wherein calculating the magnification error comprises calculating a first magnification error based on the calculated lengths of a first side for the front and back sides respectively, and calculating a second magnification error based on the calculated lengths of a second side parallel to the first side in the same manner, and wherein calculating the correction amount comprises calculating a correction amount between the first and second sides on the assumption that the magnification error linearly varies between the first and second sides from the first magnification error to the second magnification error.

16. The method of claim 13, wherein a cross mark which consists of two orthogonally crossing line segments is formed as the pattern in the vicinity of each of the four corners of the recording sheet in advance of reading the image data by the scanner device.

17. The method of claim 16, wherein obtaining the displacement amount comprises:

defining a detection area for detecting the pattern in a predetermined area inside each of the four apices;

detecting intersection coordinates of the four cross marks as the pattern in the coordinate system of the image data by scanning the image data within the detection areas in a main scanning direction and a subscanning direction; and obtaining coordinate positions of the four cross marks based on the four intersection coordinates and the approximate expressions in a X-Y coordinate system defined by the main scanning direction and the subscanning direction of the recording sheet.

18. The method of claim 11, wherein calculating the magnification error comprises calculating a magnification error based on the calculated lengths of the sides corresponding between the front and back sides and extending in a subscanning direction, and wherein calculating the correction amount comprises calculating a correction amount based on the calculated magnification error in order to make the lengths of the sides extending in the subscanning direction match each other.

19. The method of claim 11, further comprising:

storing a normal range of the magnification error; and notify a user of a reading fault when the calculated magnification error is outside of the stored normal range.

20. The method of claim 11, wherein in addition to the patterns, marks which are different between the front and back sides are formed in positions which are separated from a center position of the recording sheet and aligned with each other between the front and back sides.

* * * * *